United States Patent
Jang et al.

(10) Patent No.: US 9,878,685 B2
(45) Date of Patent: Jan. 30, 2018

(54) AIRBAG APPARATUS

(71) Applicant: HYUNDAI MOBIS Co., Ltd., Yongin-si, Gyeonggi-do (KR)

(72) Inventors: Rae Ick Jang, Yongin-si (KR); Jae Hyun Kim, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/095,306

(22) Filed: Apr. 11, 2016

(65) Prior Publication Data

US 2017/0151926 A1    Jun. 1, 2017

(30) Foreign Application Priority Data

Nov. 26, 2015  (KR) .......................... 10-2015-0166513

(51) Int. Cl.
*B60R 21/239* (2006.01)
*B60R 21/2338* (2011.01)
*B60R 21/231* (2011.01)

(52) U.S. Cl.
CPC ........ *B60R 21/239* (2013.01); *B60R 21/2338* (2013.01); *B60R 2021/2395* (2013.01); *B60R 2021/23115* (2013.01); *B60R 2021/23382* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,597,356 B2 * | 10/2009 | Williams | ............ | B60R 21/2338 280/736 |
| 7,938,445 B2 * | 5/2011 | Smith | ................. | B60R 21/2338 280/743.2 |
| 7,946,613 B2 * | 5/2011 | Rose | .................... | B60R 21/2338 280/729 |
| 8,191,925 B2 * | 6/2012 | Williams | ............ | B60R 21/2338 280/739 |
| 8,419,056 B2 * | 4/2013 | Parks | .................. | B60R 21/2346 280/739 |
| 9,027,956 B2 * | 5/2015 | Yamaji | .................. | B60R 21/203 280/729 |
| 9,199,601 B2 * | 12/2015 | Yamaji | .................. | B60R 21/239 |
| 9,308,883 B1 * | 4/2016 | Schneider | ............. | B60R 21/231 |

(Continued)

FOREIGN PATENT DOCUMENTS

| | | |
|---|---|---|
| KR | 10-2005-0101977 A | 10/2005 |
| KR | 10-2010-0062463 A | 6/2010 |
| KR | 10-2011-0100062 A | 9/2011 |

OTHER PUBLICATIONS

Oct. 13, 2016, Korean Office Action for related KR application No. 10-2015-0166513.

*Primary Examiner* — Nicole T Verley
(74) *Attorney, Agent, or Firm* — Paratus Law Group, PLLC

(57) ABSTRACT

An airbag apparatus according to the exemplary embodiment of the present invention includes: an airbag which is inflated when gas flows into the airbag, and has a left opening hole formed in a left surface, and a right opening hole formed in a right surface; and a cylinder which is disposed in the airbag while connecting the left opening hole and the right opening hole, and has a vent hole through which the gas flowing into the airbag is discharged.

9 Claims, 5 Drawing Sheets

(56) References Cited

U.S. PATENT DOCUMENTS

| | | | |
|---|---|---|---|
| 9,539,979 B2* | 1/2017 | Miyata | B60R 21/205 |
| 2008/0073893 A1* | 3/2008 | Schneider | B60R 21/2338 |
| | | | 280/740 |
| 2008/0303256 A1* | 12/2008 | Williams | B60R 21/2338 |
| | | | 280/742 |
| 2009/0160169 A1* | 6/2009 | Parks | B60R 21/239 |
| | | | 280/742 |
| 2010/0225094 A1* | 9/2010 | Rose | B60R 21/2338 |
| | | | 280/729 |
| 2010/0225095 A1* | 9/2010 | Smith | B60R 21/2338 |
| | | | 280/729 |
| 2013/0313809 A1* | 11/2013 | Yamaji | B60R 21/203 |
| | | | 280/729 |
| 2017/0057455 A1* | 3/2017 | Lachat | B60R 21/2338 |

* cited by examiner

AIRBAG APPARATUS

CROSS-REFERENCE TO RELATED APPLICATIONS

The present application claims priority to Korean Patent Application Number 10-2015-0166513 filed Nov. 26, 2015, the entire contents of which the application is incorporated herein for all purposes by this reference.

TECHNICAL FIELD

The present invention relates to an airbag apparatus, and more particularly, to an airbag apparatus capable of adjusting the amount of gas discharged from an airbag.

BACKGROUND

In general, an airbag is installed in an automobile in order to protect an occupant using cushioning force at the time of an accident.

The airbag is inflated and deployed when gas generated by an inflator flows into the airbag. The inflator generates the amount of gas larger than an internal volume of the airbag to sufficiently inflate the airbag.

Therefore, in a case in which the gas flowing into the airbag is not discharged, the airbag is excessively inflated, and for this reason, the occupant may be seriously injured due to excessive expansive pressure in the airbag when the occupant comes into contact with the airbag. To prevent the occupant from being injured due to the excessive expansive pressure in the airbag as described above, a vent hole through which the gas flowing into the airbag is discharged is formed in the airbag.

However, in a case in which an excessive large amount of gas is discharged through the vent hole, the airbag becomes excessively loosened, and for this reason, the airbag bounces and shakes a head of the occupant when the occupant comes into contact with the airbag, which causes an injury to a neck of the occupant.

As described above, the adjustment of the amount of gas discharged from the airbag has a great effect on safety of the occupant.

SUMMARY

The present invention has been made in an effort to provide an airbag apparatus capable of preventing an injury to an occupant by adjusting the amount of gas discharged from an airbag.

Technical problems of the present invention are not limited to the aforementioned technical problem, and other technical problems, which are not mentioned above, may be clearly understood by those skilled in the art from the following descriptions.

An exemplary embodiment of the present invention provides an airbag apparatus including: an airbag which is inflated when gas flows into the airbag, and has a left opening hole formed in a left surface, and a right opening hole formed in a right surface; and a cylinder which is disposed in the airbag while connecting the left opening hole and the right opening hole, and has a vent hole through which the gas flowing into the airbag is discharged, in which the vent hole is disposed at the opposite side to a surface of the airbag with which the occupant comes into contact.

Another exemplary embodiment of the present invention provides an airbag apparatus including: an airbag which is inflated when gas flows into the airbag, and has a left opening hole formed in a left surface, and a right opening hole formed in a right surface; a cylinder which is disposed in the airbag while connecting the left opening hole and the right opening hole, and has a vent hole through which the gas flowing into the airbag is discharged; and at least one tether which has one end coupled to the airbag, and the other end coupled to the cylinder.

Other detailed matters of the exemplary embodiment are included in the detailed description and the drawings.

According to the airbag apparatus according to the exemplary embodiments of the present invention, since the vent hole formed in the cylinder is opened while the airbag is inflated, such that gas in the airbag is discharged, it is possible to decrease initial deployment pressure of the airbag, and as a result, it is possible to prevent an occupant such as an infant, a child, and an adult person with a small body frame from being injured due to the initial deployment pressure of the airbag. In addition, immediately before the airbag is fully inflated such that the occupant comes into contact with the airbag, the airbag may maintain appropriate pressure that does not cause an injury to the occupant.

In addition, when the airbag is pressed by the occupant after the airbag is fully inflated, the cylinder is folded to shield the vent hole such that the discharge of gas is blocked, and as a result, it is possible to prevent the airbag from bouncing after the occupant comes into contact with the airbag, thereby preventing an injury to the neck of the occupant.

The effects of the present invention are not limited to the aforementioned effects, and other effects, which are not mentioned above, will be clearly understood by those skilled in the art from the claims.

DETAILED DESCRIPTION

Figure 1:
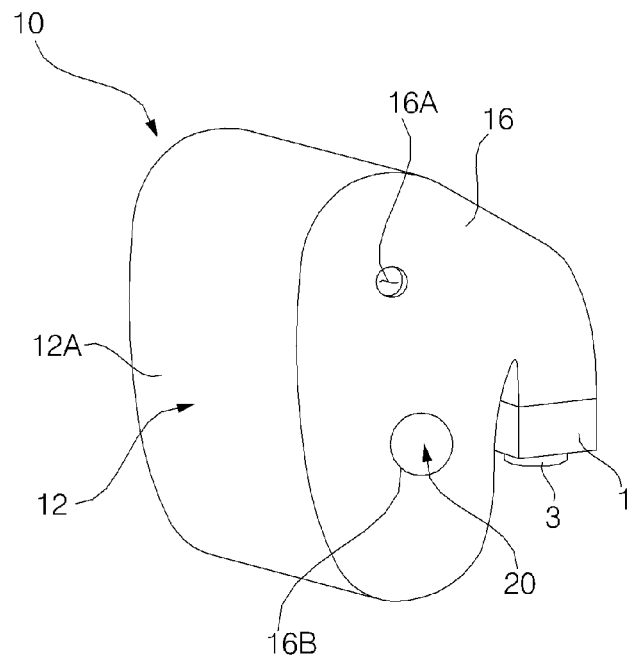
FIG. 1 is a perspective view illustrating a state in which an airbag of an airbag apparatus according to a first exemplary embodiment of the present invention is fully inflated.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag apparatus according to exemplary embodiments of the present invention will be described with reference to the drawings.

Figure 2:
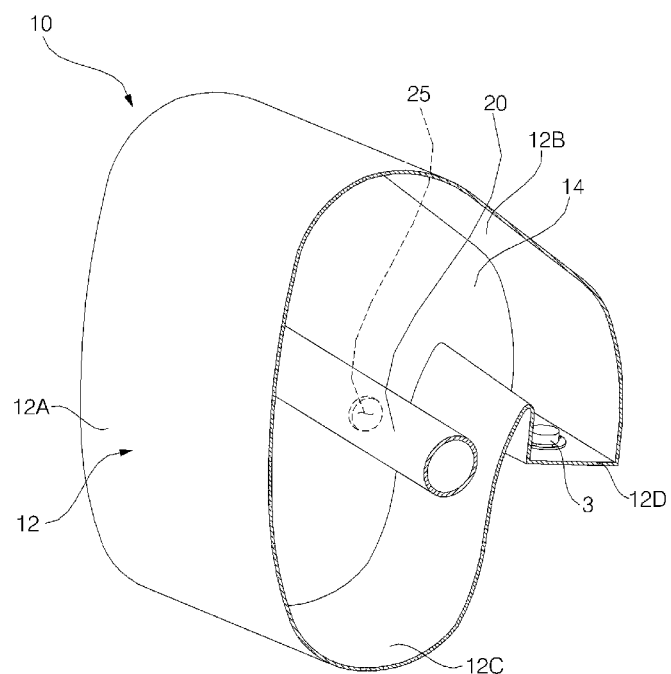
FIG. 2 is a perspective view illustrating an interior of the airbag apparatus according to the first exemplary embodiment of the present invention.
Figure 3:
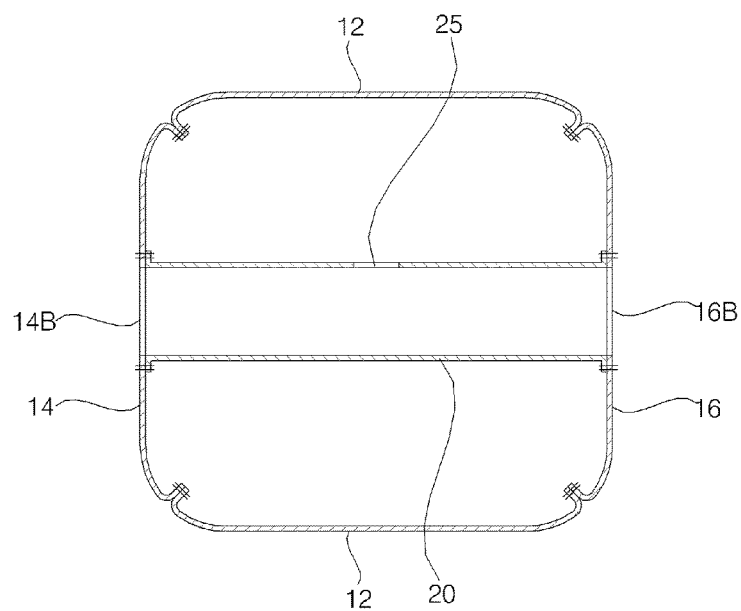
FIG. 3 is a cross-sectional plan view illustrating the airbag apparatus according to the first exemplary embodiment of the present invention.
Figure 4:
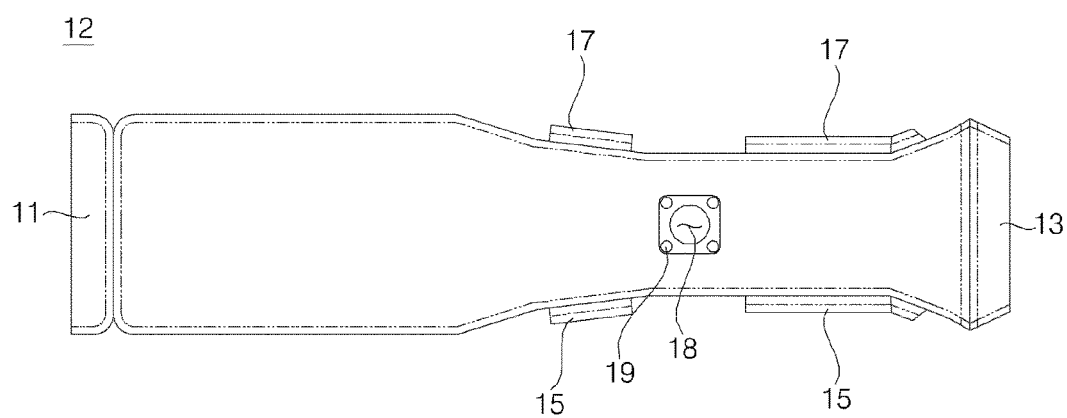
FIG. 4 is a view illustrating a state in which a main panel and side panels illustrated in FIGS. 1 to 3 are spread out before being coupled to each other.
Figure 5:
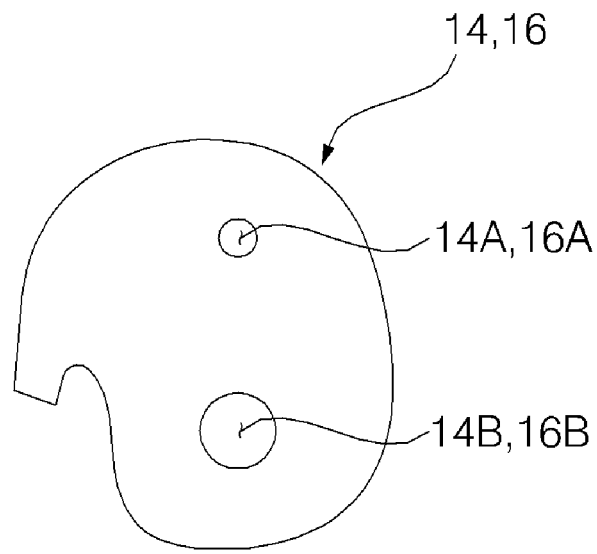
FIG. 5 is a view illustrating the side panel illustrated in FIGS. 1 to 3.

FIG. 1 is a perspective view illustrating a state in which an airbag of an airbag apparatus according to a first exemplary embodiment of the present invention is fully inflated, FIG. 2 is a perspective view illustrating an interior of the airbag apparatus according to the first exemplary embodiment of the present invention, FIG. 3 is a cross-sectional plan view illustrating the airbag apparatus according to the first exemplary embodiment of the present invention, FIG. 4 is a view illustrating a state in which a main panel and side panels illustrated in FIGS. 1 to 3 are spread out before being coupled to each other, and FIG. 5 is a view illustrating the side panel illustrated in FIGS. 1 to 3.

Referring to FIGS. 1 to 5, an airbag apparatus according to a first exemplary embodiment of the present invention includes an airbag 10, and a cylinder 20.

When gas flows into the airbag 10, the airbag 10 is deployed forward toward an occupant. An inflator 3, which generates gas and discharges the gas into the airbag 10, is coupled to a rear surface 12D of the airbag 10. In addition, an airbag housing 1, which accommodates the airbag 10, is coupled to the rear surface 12D of the airbag 10.

The airbag 10 is made of a flexible material. The airbag 10 is folded and then accommodated in the airbag housing 1. A head portion of the inflator 3 is inserted into the airbag housing 1 from a lower side of the airbag housing 1, and then inserted into and disposed in the airbag 10. A plurality of discharge holes, through which gas is discharged, is formed in the head portion of the inflator 3. The airbag 10 and the inflator 3 are coupled to the airbag housing 1 by means of a fastening member such as a bolt.

The airbag housing 1 is mounted in an instrument panel and disposed at an upper side of a glove box. That is, the airbag apparatus according to the first exemplary embodiment of the present invention is a passenger airbag apparatus for protecting a passenger seated in a passenger seat. However, the airbag apparatus according to the first exemplary embodiment of the present invention is not limited to the passenger airbag apparatus.

The airbag 10 has a left opening hole 14B formed in a left surface 14, and a right opening hole 16B formed in a right surface 16. The cylinder 20 is disposed in the airbag 10 while connecting the left opening hole 14B and the right opening hole 16B.

The cylinder 20 is formed in a cylindrical shape that is opened at left and right ends thereof. The cylinder 20 need not necessarily have a cylindrical shape, and may have various shapes as long as the cylinder 20 is opened at the left and right ends thereof and has therein a space. For example, the shape of the cylinder 20 may be changed to various shapes such as a quadrangular tubular shape that is opened at left and right ends thereof, and a triangular tubular shape that is opened at left and right ends thereof.

The opened left end of the cylinder 20 is coupled to the left surface 14 of the airbag 10 and communicates with the left opening hole 14B, and the opened right end of the cylinder 20 is coupled to the right surface 16 of the airbag 10 and communicates with the right opening hole 16B.

A portion between an inner surface of the airbag 10 and an outer surface of the cylinder 20 is filled with gas discharged from the inflator 3, and as a result, the airbag 10 is inflated and deployed forward toward the occupant.

The airbag 10 includes a front surface 12A, an upper surface 12B, a lower surface 12C, and the rear surface 12D. The upper surface 12B extends rearward from an upper end of the front surface 12A, the lower surface 12C extends rearward from a lower end of the front surface 12A, and the rear surface 12D extends between a rear end of the upper surface 12B and a rear end of the lower surface 12C.

When the airbag 10 is fully inflated and deployed forward toward the occupant, a head and a chest of the occupant come into contact with the front surface 12A, a windshield, which is a front glass window of the automobile, comes into contact with the upper surface 12B, a leg of the occupant comes into contact with the lower surface 12C, and the instrument panel, which is positioned at the upper side of the glove box, comes into contact with the rear surface 12D.

The cylinder 20 forms an internal space that extends between the left opening hole 14B and the right opening hole 16B. In the case of the airbag 10 of the airbag apparatus according to the first exemplary embodiment of the present invention, an internal volume of the airbag 10 is decreased by a volume of the internal space in comparison with an airbag without having this internal space. While a high capacity inflator, which generates a large amount of gas, needs to be coupled to the airbag without having this internal space, a low capacity inflator, which generates a smaller amount of gas than the high capacity inflator, that is, generates the amount of gas corresponding to a volume excluding the volume of the internal space, may be coupled to the airbag 10 of the airbag apparatus according to the first exemplary embodiment of the present invention.

Main vent holes 14A and 16A, through which gas flowing in between the inner surface of the airbag 10 and the outer surface of the cylinder 20 is discharged, are formed in the left surface 14 and the right surface 16, respectively. The main vent holes 14A and 16A are opened while the airbag 10 is inflated, and kept open even after the airbag 10 is fully inflated and the occupant comes into contact with the airbag 10. The main vent holes 14A and 16A include a left main vent hole 14A formed in the left surface 14, and a right main vent hole 16A formed in the right surface 16.

In addition, a vent hole 25 through which the gas flowing in between the inner surface of the airbag 10 and the outer surface of the cylinder 20 is discharged is formed in the cylinder 20. The vent hole 25 is formed at a position of the cylinder 20 which is directed toward the rear surface 12D of the airbag 10. The vent hole 25 need not be necessarily formed at the position of the cylinder 20 which is directed toward the rear surface 12D of the airbag 10. For example, the vent hole 25 may be formed at a position of the cylinder 20 which is directed toward the front surface 12A of the airbag 10, at a position which is directed toward the upper surface 12B of the airbag 10, or at a position which is directed toward the lower surface 12C of the airbag 10. Pressure of gas in the airbag 10 may be variously changed depending on the position of the cylinder 20 where the vent hole 25 is formed.

In a case in which the vent hole 25 is formed at the position of the cylinder 20 which is directed toward the rear surface 12D of the airbag 10 as described in the present exemplary embodiment, it is possible to decrease initial deployment pressure of the airbag 10 in comparison with the case in which the vent hole 25 is formed at the position of the cylinder 20 which is directed toward the front surface 12A, the upper surface 12B, or the lower surface 12C of the airbag 10.

In addition, in a case in which the vent hole 25 is formed at the position of the cylinder 20 which is directed toward the rear surface 12D of the airbag 10 as described in the present exemplary embodiment, the vent hole 25 is disposed at the opposite side to the front surface 12A which is a surface of the airbag 10 with which the occupant comes into contact. Therefore, it is possible to prevent the gas flowing in between the front surface 12A and the cylinder 20 from being rapidly discharged through the vent hole 25 in comparison with the case in which the vent hole 25 is formed at the position of the cylinder 20 which is directed toward the front surface 12A of the airbag 10, thereby preventing pressure of gas between the front surface 12A and the cylinder 20 from being excessively decreased immediately before the occupant comes into contact with the front surface 12A.

In addition, in a case in which the vent hole 25 is formed at the position of the cylinder 20 which is directed toward the front surface 12A of the airbag 10, the vent hole 25 is not properly clogged due to pressure of gas between the front surface 12A and the cylinder 20 when the front surface 12A is pressed by the occupant after the occupant comes into contact with the front surface 12A of the airbag 10, and as a result, an excessively large amount of gas between the front surface 12A and the cylinder 20 is discharged through the vent hole 25, and thus in the exemplary embodiment, the vent hole 25 may be disposed at the opposite side to the front surface 12A which is the surface of the airbag 10 with which the occupant comes into contact. Meanwhile, while only one vent hole 25 is formed in the cylinder 20 in the present first exemplary embodiment, the number of vent holes 25 may be variously changed to adjust the deployment pressure of the airbag 10.

The gas, which is discharged from the interior of the airbag 10 into the cylinder 20 through the vent hole 25, is discharged to the outside of the airbag 10 through the left opening hole 14B and the right opening hole 16B.

The cylinder 20 is made of a flexible material. The cylinder 20 may be made of the same material as the airbag 10. When the airbag 10 is pressed by the occupant after the airbag is fully inflated, the cylinder 20 is folded to shield the vent hole 25 by force of the occupant which presses the airbag 10.

The airbag 10 is manufactured by sewing three pieces of flexible panels. That is, the airbag 10 includes a main panel 12 with which the occupant comes into contact, a left side panel 14 which forms the left surface 14 of the airbag 10, and a right side panel 16 which forms the right surface 16 of the airbag 10. Here, because the left surface 14 and the left side panel 14 are substantially the same configuration, the same reference numerals refer to the left surface 14 and the left side panel 14, and because the right surface 16 and the right side panel 16 are substantially the same configuration, the same reference numerals refer to the right surface 16 and the right side panel 16.

The main panel 12 forms the front surface 12A, the upper surface 12B, the lower surface 12C, and the rear surface 12D of the airbag 10. As illustrated in FIG. 4, an inflator hole 18 into which the head portion of the inflator 3 is inserted is formed in a portion of the main panel 12 where the rear surface 12D of the airbag 10 is formed, and a plurality of fastening holes 19, which is coupled to the inflator 3 and the airbag housing 1 by means of the fastening members, is formed at the periphery of the inflator hole 18. In a state in which the main panel 12 is spread out to be flat as illustrated in FIG. 4, a first coupling portion 11 is formed at one end in the longitudinal direction, a second coupling portion 13 is formed at the other end in the longitudinal direction, a pair of third coupling portions 15 is formed at the left side, and a pair of fourth coupling portions 17 is formed at the right side. In a state in which the main panel 12 is spread out to be flat as illustrated in FIG. 4, the main panel 12 is formed in an annular shape by coupling the first coupling portion 11 and the second coupling portion 13 together by sewing. In addition, a circumference of the left side panel 14 is coupled, by sewing, to the left side of the main panel 12 which corresponds to a portion between the first coupling portion 11 and the second coupling portion 13, and in this case, the pair of third coupling portions 15 is coupled to the left side panel 14 by sewing, such that the left side panel 14 may be securely coupled to the left side of the main panel 12. In addition, a circumference of the right side panel 16 is coupled, by sewing, to the right side of the main panel 12 which corresponds to a portion between the first coupling portion 11 and the second coupling portion 13, and in this case, the pair of fourth coupling portions 17 is coupled to the right side panel 16 by sewing, such that the right side panel 16 may be securely coupled to the right side of the main panel 12.

The left side panel 14 and the right side panel 16 are formed to have the same size and shape. The left opening hole 14B is formed in the left side panel 14, and the right opening hole 16B is formed in the right side panel 16.

The left end of the cylinder 20 is coupled to the left side panel 14 and communicates with the left opening hole 14B, and the right end of the cylinder 20 is coupled to the right side panel 16 and communicates with the right opening hole 16B.

Figure 6:
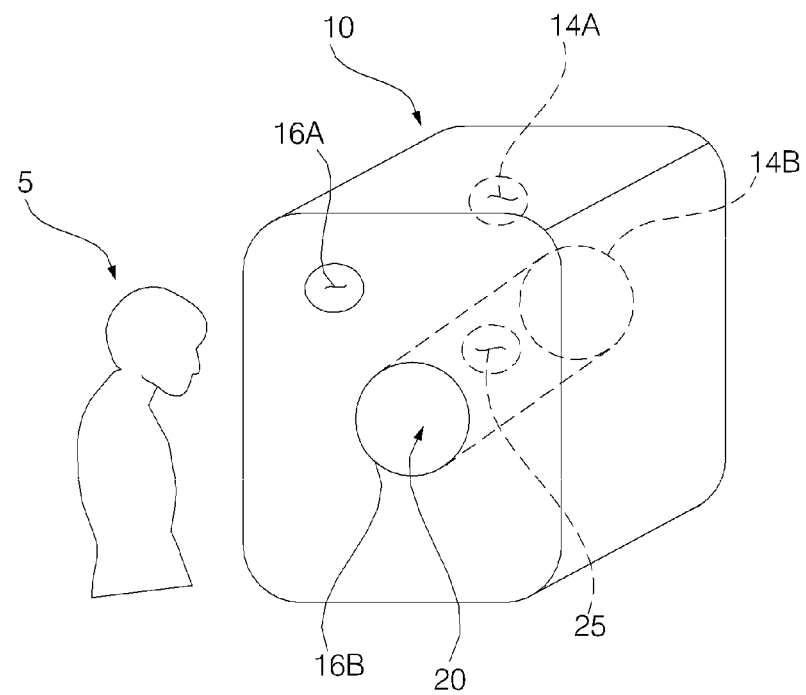
FIG. 6 is a conceptual view illustrating a state before an occupant comes into contact with the airbag of the airbag apparatus according to the first exemplary embodiment of the present invention after the airbag is fully inflated.

FIG. 6 is a conceptual view illustrating a state before the occupant comes into contact with the airbag of the airbag apparatus according to the first exemplary embodiment of the present invention after the airbag is fully inflated.

Referring to FIG. 6, the main vent holes 14A and 16A and the vent hole 25 are opened while the airbag 10 is inflated, thereby discharging gas from the interior of the airbag 10. Therefore, it is possible to decrease initial deployment pressure of the airbag 10, and as a result, it is possible to prevent an occupant 5 such as an infant, a child, and an adult person with a small body frame from being injured due to the initial deployment pressure of the airbag 10. In addition, immediately before the airbag 10 is fully inflated such that the occupant 5 comes into contact with the front surface 12A of the airbag 10, the airbag 10 may maintain appropriate pressure that does not cause an injury to the occupant 5.

Figure 7:
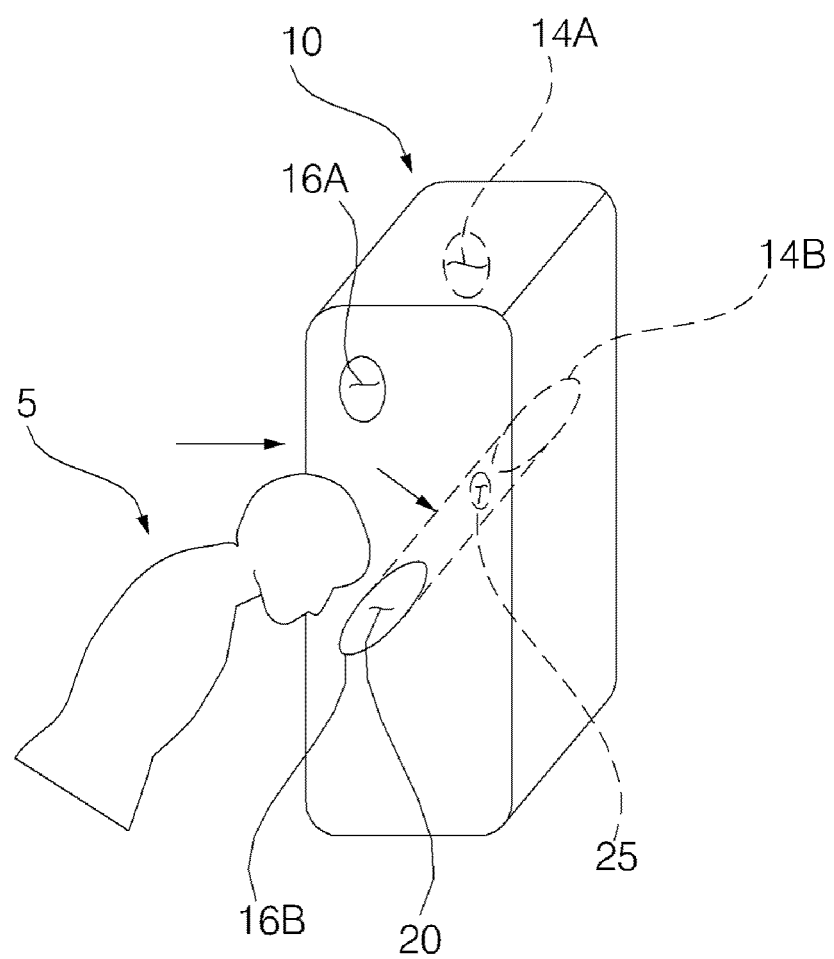
FIG. 7 is a conceptual view illustrating a state after the occupant comes into contact with the airbag of the airbag apparatus according to the first exemplary embodiment of the present invention after the airbag is fully inflated.

FIG. 7 is a conceptual view illustrating a state after the occupant comes into contact with the airbag of the airbag apparatus according to the first exemplary embodiment of the present invention after the airbag is fully inflated.

Referring to FIG. 7, when the front surface 12A is pressed by the occupant 5 after the airbag 10 is fully inflated such that the occupant 5 comes into contact with the front surface 12A of the airbag 10, the main vent holes 14A and 16A are kept open, and the cylinder 20 shields the vent hole 25 while being folded by force of the occupant 5 which presses the front surface 12A. Therefore, it is possible to prevent an excessive amount of gas from being discharged from the interior of the airbag 10 after the airbag 10 is fully inflated such that the occupant 5 comes into contact with the front surface 12A of the airbag 10, and as a result, a tightened state of the airbag 10 is maintained, and the airbag 10 does not bounce, thereby maintaining appropriate pressure that does not cause an injury to the neck of the occupant 5.

Figure 8:
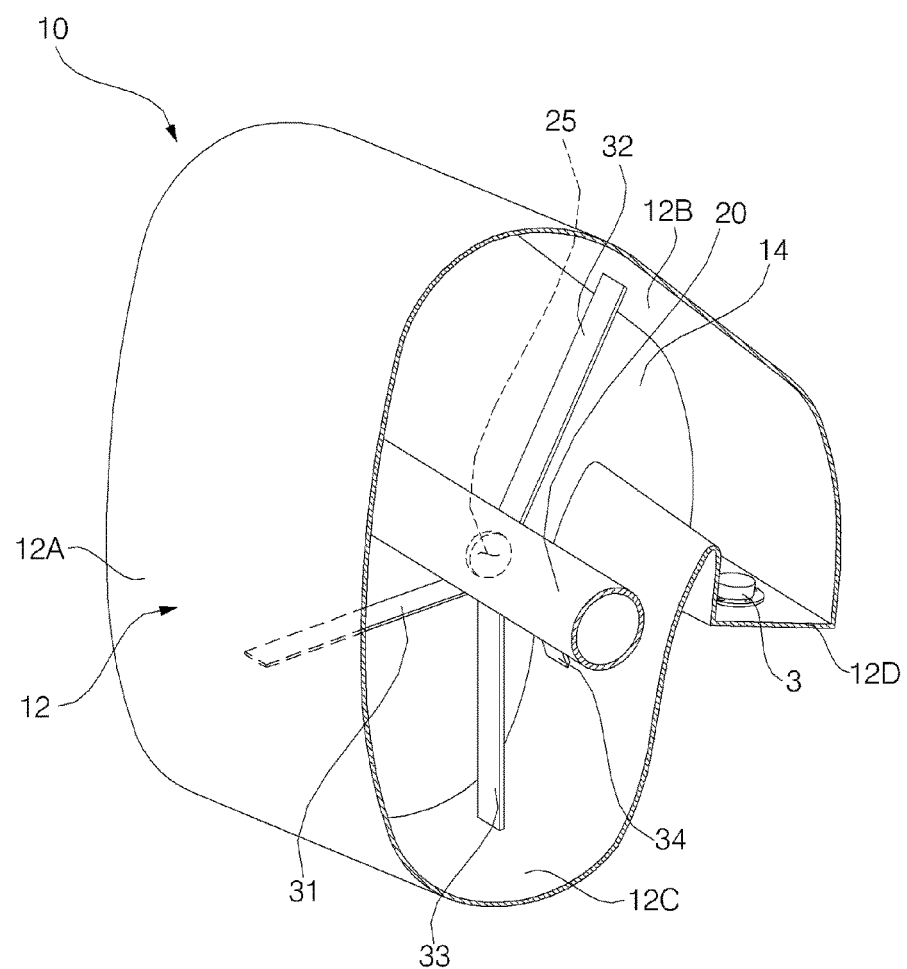
FIG. 8 is a view illustrating an interior of an airbag apparatus according to a second exemplary embodiment of the present invention.

FIG. 8 is a view illustrating an interior of an airbag apparatus according to a second exemplary embodiment of the present invention. Hereinafter, like reference numerals refer to constituent elements identical to those of the aforementioned first exemplary embodiment, a description thereof will be omitted, and only differences between the exemplary embodiments will be described.

Referring to FIG. 8, it can be seen that the airbag apparatus according to the second exemplary embodiment of the present invention differs from the airbag apparatus illustrated in FIG. 2 according to the aforementioned first exemplary embodiment.

That is, in the airbag apparatus according to the second exemplary embodiment of the present invention, at least one tether 31, 32, 33, or 34 is further disposed in the airbag 10 in comparison with the airbag apparatus according to the aforementioned first exemplary embodiment.

The at least one tether 31, 32, 33, or 34 has one end coupled to the inner surface of the airbag 10, and the other end coupled to the outer surface of the cylinder 20. The at least one tether 31, 32, 33, or 34 is made of a flexible material. The at least one tether 31, 32, 33, or 34 may be made of the same material as the airbag 10. The at least one tether 31, 32, 33, or 34 pulls the airbag 10 and the cylinder 20 while being tightened as the airbag 10 is inflated, thereby adjusting an internal volume of the airbag 10 and adjusting an internal volume of the cylinder 20. It is possible to variously adjust the internal volume of the airbag 10 and the internal volume of the cylinder 20 by changing a length of the at least one tether 31, 32, 33, or 34.

The tethers 31, 32, 33, and 34 include a first tether 31, a second tether 32, a third tether 33, and a fourth tether 34. The first tether 31 has one end coupled to the front surface 12A of the main panel 12, and the other end coupled to the cylinder 20. The second tether 32 has one end coupled to the upper surface 12B of the main panel 12, and the other end coupled to the cylinder 20. The third tether 33 has one end coupled to the lower surface 12C of the main panel 12, and the other end coupled to the cylinder 20. The fourth tether 34 has one end coupled to the rear surface 12D of the main panel 12, and the other end of the cylinder 20. While four tethers 31, 32, 33, and 34 are provided in the present second exemplary embodiment, the number of tethers may be variously changed depending on the shape of the airbag 10, and the positions where the tethers are coupled to the airbag 10 and the cylinder 20 may also be variously changed.

As described above, according to the airbag apparatus according to the exemplary embodiments of the present invention, since the vent hole 25 formed in the cylinder 20 is opened while the airbag 10 is inflated, such that gas in the airbag 10 is discharged, it is possible to decrease initial deployment pressure of the airbag 10, and as a result, it is possible to prevent an occupant such as an infant, a child, and an adult person with a small body frame from being injured due to the initial deployment pressure of the airbag 10. In addition, immediately before the airbag 10 is fully inflated such that the occupant comes into contact with the airbag 10, the airbag 10 may maintain appropriate pressure that does not cause an injury to the occupant.

In addition, when the airbag 10 is pressed by the occupant after the airbag 10 is fully inflated, the cylinder 20 is folded to shield the vent hole 25 such that the discharge of gas is blocked, and as a result, it is possible to prevent the airbag 10 from bouncing after the occupant comes into contact with the airbag 10, thereby preventing an injury to the neck of the occupant.

It may be understood by a person skilled in the art that the present invention may be carried out in other specific forms without changing the technical spirit or the essential characteristics of the present invention. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. An airbag apparatus comprising:
    an airbag configured to be inflated when gas flows into the airbag, and including a left opening hole formed in a left surface and a right opening hole formed in a right surface; and
    a cylinder disposed in the airbag while connecting the left opening hole and the right opening hole to each other, and including a vent hole through which the gas flowing into the airbag is discharged,
    wherein the vent hole is disposed at a side opposite to a surface of the airbag which faces an occupant when the airbag is fully inflated,
    wherein the left opening hole and the right opening hole are configured to be kept being open when the airbag is fully inflated such that the gas flowed into the airbag is discharged through the left opening hole and the right opening hole via the vent hole of the cylinder, and
    wherein the cylinder is configured to be folded to shield the vent hole when the airbag is pressed by the occupant such that the gas is prevented from being discharged through the left opening hole and the right opening hole via the vent hole when the airbag is pressed by the occupant.

2. The airbag apparatus of claim 1, wherein a portion between an inner surface of the airbag and an outer surface of the cylinder is filled with the gas flowing into the airbag.

3. The airbag apparatus of claim 1, wherein the cylinder has a left end which is coupled to the left surface and communicates with the left opening hole, and a right end which is coupled to the right surface and communicates with the right opening hole.

4. The airbag apparatus of claim 1, wherein the airbag includes:
    a front surface with which an occupant comes into contact;
    an upper surface which extends rearward from an upper end of the front surface;
    a lower surface which extends rearward from a lower end of the front surface; and
    a rear surface which extends between a rear end of the upper surface and a rear end of the lower surface.

5. The airbag apparatus of claim 4, wherein an inflator, which generates gas, is coupled to the rear surface.

6. The airbag apparatus of claim 4, further comprising:
    a first tether which has one end coupled to the front surface, and the other end coupled to the cylinder;
    a second tether which has one end coupled to the upper surface, and the other end coupled to the cylinder;
    a third tether which has one end coupled to the lower surface, and the other end coupled to the cylinder; and a fourth tether which has one end coupled to the rear surface, and the other end coupled to the cylinder.

7. The airbag apparatus of claim 6, wherein the first tether, the second tether, the third tether, and the fourth tether are disposed in the airbag.

8. The airbag apparatus of claim 1, wherein main vent holes, through which gas is discharged, are further formed in the left surface and the right surface.

9. The airbag apparatus of claim 1, wherein the airbag includes:
- a main panel with which an occupant comes into contact;
- a left side panel which has a circumference coupled to a left side of the main panel, and forms the left surface; and
- a right side panel which has a circumference coupled to a right side of the main panel, and forms the right surface.

* * * * *